US010541965B2

(12) United States Patent
Liu et al.

(10) Patent No.: US 10,541,965 B2
(45) Date of Patent: Jan. 21, 2020

(54) DELAYING A SOCIAL MEDIA POST

(71) Applicants: Jerry C. Liu, Dunwoody, GA (US); John L. Doughty, Acworth, GA (US)

(72) Inventors: Jerry C. Liu, Dunwoody, GA (US); John L. Doughty, Acworth, GA (US)

(*) Notice: Subject to any disclaimer, the term of this patent is extended or adjusted under 35 U.S.C. 154(b) by 166 days.

(21) Appl. No.: 15/722,690

(22) Filed: Oct. 2, 2017

(65) Prior Publication Data
US 2018/0097770 A1    Apr. 5, 2018

Related U.S. Application Data

(60) Provisional application No. 62/403,197, filed on Oct. 2, 2016.

(51) Int. Cl.
*H04L 12/58*  (2006.01)
*G06F 3/0484* (2013.01)

(52) U.S. Cl.
CPC .......... *H04L 51/32* (2013.01); *G06F 3/04842* (2013.01)

(58) Field of Classification Search
CPC .................. H04L 51/32; G06F 3/04842
See application file for complete search history.

(56) References Cited

U.S. PATENT DOCUMENTS

| | | | | |
|---|---|---|---|---|
| 9,413,809 | B1* | 8/2016 | Morse | H04L 67/02 |
| 2013/0246521 | A1* | 9/2013 | Schacht | G06Q 50/01 |
| | | | | 709/204 |
| 2013/0340089 | A1* | 12/2013 | Steinberg | H04L 63/10 |
| | | | | 726/27 |
| 2015/0237464 | A1* | 8/2015 | Shumaker | H04L 51/20 |
| | | | | 709/204 |
| 2015/0242815 | A1* | 8/2015 | Velasco | H04W 4/21 |
| | | | | 705/321 |
| 2015/0281159 | A1* | 10/2015 | Abuelsaad | H04L 51/20 |
| | | | | 709/206 |
| 2017/0237698 | A1* | 8/2017 | Besnard | G06F 16/9574 |
| | | | | 709/206 |
| 2017/0302610 | A1* | 10/2017 | Naidu | H04L 51/32 |

* cited by examiner

*Primary Examiner* — Michael A Keller
(74) *Attorney, Agent, or Firm* — Doughty Law, L.L.C.; John L. Doughty

(57) ABSTRACT

A social media application, platform, or computer system facilitating same presents a user with an option to post information later, as opposed to immediately. If the user selects to post later, the user may select a time, enter a time, or select a random time for the post to occur. The user may select a range from which the randomly selected posting time occurs. The computer system may be a user device or a server computer device, either of which may determine a random value for use in causing the information-to-be-posted to post randomly within the selected time range. The computer system may analyze multiple posts from multiple source and append information-to-be-posted to postings of others that contain content related to the information-to-be-posted.

9 Claims, 17 Drawing Sheets

You have selected for your Posts to occur at a random time between 9:30PM and 7:00AM. If you would like to change this, please click here. Otherwise click here to post now.

[Post at selected time] [Post now]

FIG. 7

FIG. 10

1105

You made the following post or comment on Sept 29, 2017. Your contact Vax Potorr has a posting that appears to be related. Would you liked to append your remark as a comment to Vax Potorr's posting?

Yes   No

YOUR POST

 John Doughty

Not sure what is going in Cuba. Sonic weapon? Sounds scary.

VAX POTORR'S POST

 Vax Potorr

U.S. Orders Diplomats out of Cuba In Response to "Sonic Weapon" Attack

 Like    Comment    Share

FIG. 11

DELAYING A SOCIAL MEDIA POST

CROSS REFERENCE TO RELATED APPLICATION

This application claims priority under 35 U.S.C. § 119(e) to U.S. Provisional Patent Application No. 62/403,197, filed Oct. 2, 2016, which is incorporated herein by reference in its entirety.

FIELD

The present invention relates to posts on social media platforms.

BACKGROUND

Many employers do not want their employees or workers to be posting on social media throughout the day. Many workers do not want to give the impression that they are not working, and instead are reading and posting on social media all the time. Additionally, users that use social media might want their posts to reach wider audiences.

BRIEF DESCRIPTION OF THE DRAWINGS

FIG. 7 illustrates an example user interface for confirming a time range for delayed posting of information.

FIG. 10 illustrates example user interfaces displaying appended information to social media posts.

FIG. 11 illustrates another example user interface displaying appended information to social media posts.

DETAILED DESCRIPTION

The present patent application now describes functionality in which a system, which can comprise user devices executing a social media application that presents the user with interfaces, as well as a social media platform provided by a network device, such as a server, host, host computer, etc., can present a user with an option to post a social media post later, as opposed to immediately. Examples of social media platforms and applications include, for example, Facebook, LinkedIn, Twitter, Google+, Instagram, Snapchat, and the like. If the user selects to post later, the user may select a time, enter a time, or have the system select a random time for the post to occur. The user may select a range from which the randomly selected posting time occurs. Or, a first user using the social media platform may choose to post information immediately instead of waiting for the system that may be hosting the social media platform to post the information.

The present patent application also describes functionality in which a social media application, platform, or system that provides an interface to a social media platform, wherein the user interface is operable for receiving an input of information to be posted on the social media platform, and receiving an indication from a user to append the information to be posted to a posting that comprises content related to the information to be posted. The system can analyze a plurality of postings on the social media platform and append the information to be posted to the one or more of the plurality of postings if the one or more of the plurality of postings comprises content related to the information to be posted. The plurality of postings can be past postings, or future postings, and the information to be posted can be appended immediately, or in accordance with delayed posting selections, as described further below.

Figure 1:
FIG. 1 illustrates an example user interface for entering information to post on a social media platform.

FIG. 1 presents an example graphical user interface 100 (e.g., webpage, dialog, window, etc.) generated by the system in which a user can enter information to be posted. The information can be a photo, a video, or any other kind of information. The user may, for example, enter some text 105 and a link 110 to an article (e.g., Michael Phelps, man of the 12,000-calorie diet . . . "). The system may also generate a preview 115 of the post (e.g., a picture extracted from the article to which the hypertext links, etc.).

The displayed GUI 100 can display some indicator 120 (e.g., an onscreen button) informing the user that if the user selects the indicator, the message may be posted. In the present application, if a user selects the "post" button, the user may be presented by the system with, for example, a set of selectable buttons indicating that the user can post now, or post later. An example of this GUI 200 is shown below as FIG. 2.

In other example implementations, these buttons can be shown on the main posting interface (e.g. FIG. 1), such that instead of having a "Post" button only, both a "Post now" and "Post later" button appear (e.g., generated in the bottom right hand corner of the GUI of FIG. 1). If the user selects "Post now", the social media entry (e.g., post) is posted. If the user selects "post later", the system may display one, or many different options for posting. As an example, the system may display a GUI listing all of the posting options, from which a user can select. For example, the system may display the GUI 300 of FIG. 3.

In this example, if a user selects the "select time" button from the GUI 300, the system may present the user with a drop-down selector in which the user may select the time of the posting. The time may be selectable from, for example, times in 15 minute increments, or half hour increments.

Figure 4:
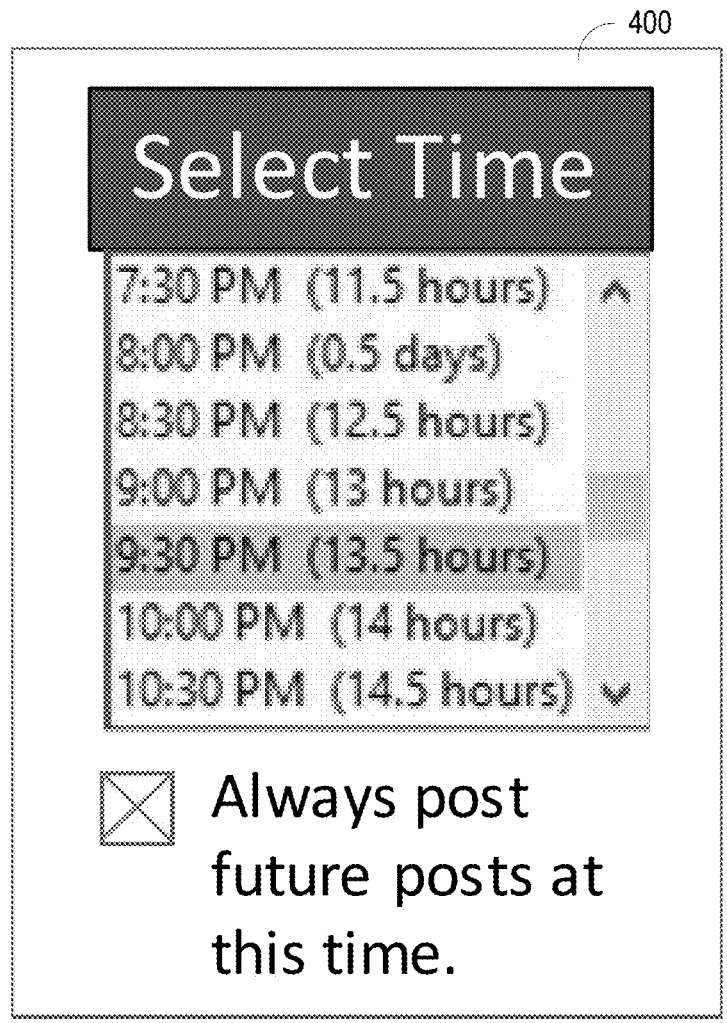
FIG. 4 illustrates an example user interface for selecting a time certain other than a current time for delayed posting of information.

The user may select the "Select time button" (or an OK button, or some other button that indicates a desire to transmit the selection). The system receives the user's selection of time (e.g., through GUI 400) of FIG. 4, and when that time occurs, the system electronically posts the social media post at that selected time. Additionally, as shown in the GUI 400 of FIG. 4, the system can present the user with an option (e.g., a check box, or some other selectable indicator) to always post social media posts at this time. Here, the user can simply check the box.

Figure 3:
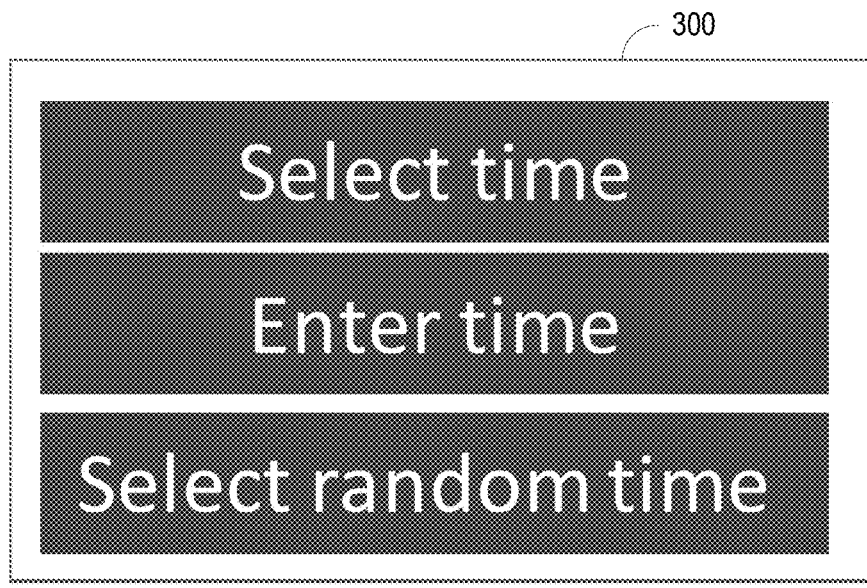
FIG. 3 illustrates an example user interface for presenting options for delaying posting of information.
Figure 5:
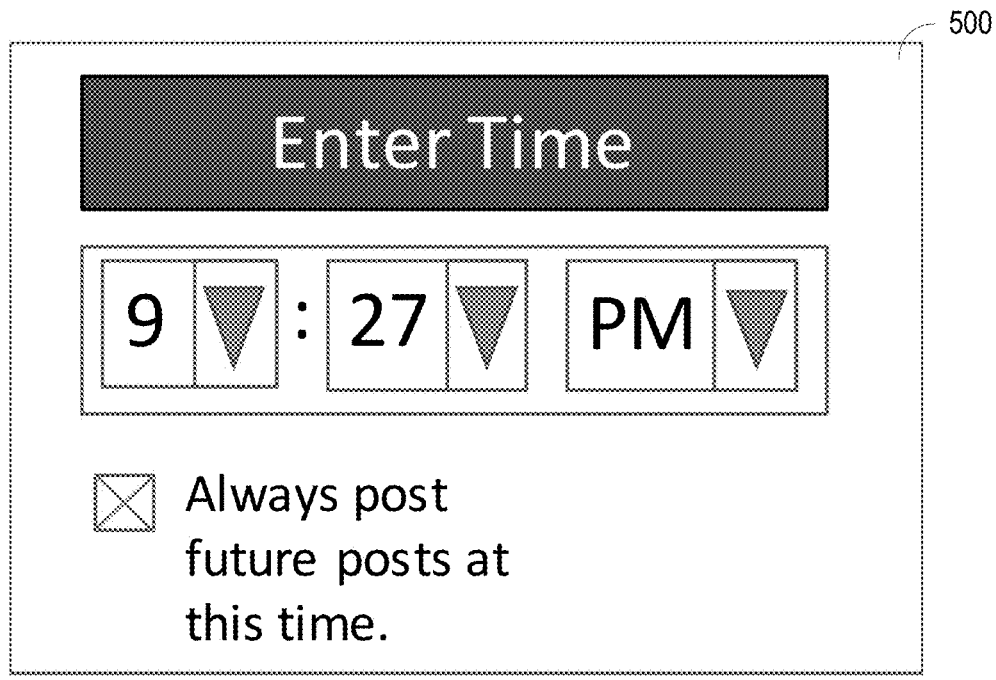
FIG. 5 illustrates an example user interface for specifying a time for delayed posting of information.

In the GUI 300 of FIG. 3, the system may also present the user with a choice to enter the future time that the post is to occur. If the user selects this choice, the system may present the user with a GUI to enter in a time for the post to occur. An example of such a GUI 500 is shown in FIG. 5. Here the user can enter time. The system can be operable to allow the user to enter time in many different ways. For example, the user can enter the time into fields that will take alphanumeric inputs. Alternatively, the system can display a GUI in which the time can be selected via a drop down menu. An example of this GUI 500 is shown in FIG. 5. Here, in the example GUI 500 of FIG. 5, the user selects the hour, the minute, and PM or AM using the drop down selectors, and then depresses the "Enter time" button (or an OK button, or some other button that indicates a desire to transmit the selection).

The system receives the user's entry of time, and when that time occurs, the system electronically posts the social media post at that entered time. Additionally, as shown in FIG. 5, the system presents the user with an option (e.g., a check box, or some other selectable indicator) to always post social media posts at this time. Here, the user can simply check the box.

Figure 6:
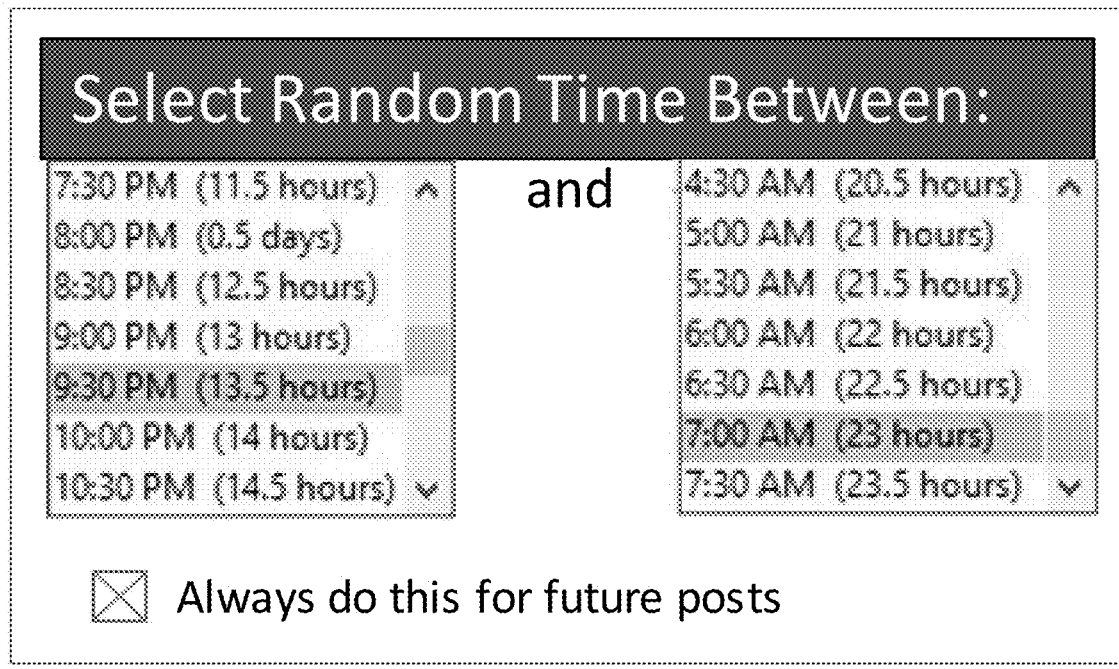
FIG. 6 illustrates an example user interface for specifying a time range for delayed posting of information.

If the system presents the user with GUI 300 of FIG. 3, and the user selects the "Select random time" button, the system, after receiving this user input, can display the example GUI 600 of FIG. 6.

In the example GUI 600 of FIG. 6, the system presents the user with a drop-down selector, which allows a user to select the interval, defined by two times, in which the user's post will be posted at random by the system. After the user selects the time, the user may select the "select random time between" button (or an OK button, or some other button that indicates a desire to transmit the selection). After the system receives the user's entry of time, the system determines a random time (using any randomizer routine, including but not limited to those known to those of ordinary skill) during the interval defined and selected by the user. When that time occurs, the system electronically posts the social media post at that randomly determined time. Additionally, as shown in FIG. 5, the system presents the user with an option (e.g., a check box, or some other selectable indicator) to always post social media posts at this time. Here, the user can simply check the box.

In example embodiments (or implementations), the next time a user creates a post and selects the "Post" button, the system can display a GUI (e.g. again, a window, dialog, or webpage), informing the user that he or she had selected a time (or random time between an interval), depending on a user's selection (for example, as made in FIG. 4, 5, or 6), and if the user indicated his or her desire to "Always do this for future posts." Here, in FIG. 7, the system shows a GUI 700 that informs the user that he or she selected a random time for the post to occur, to be posted between 9:30 PM and 7:00 AM.

The system can also inform the user by displaying, e.g., via the GUI 700 of FIG. 7, that the user can change his or her selected future time posting (for example, by clicking on the displayed "here" link). If the user clicks the "here" link, the system may present the user with, for example, the interface of FIG. 4, FIG. 5, or of FIG. 6 so that the user can change the time in which future postings occur. The user can also be presented by the system with the option to "Post now"—as shown in FIG. 7, the user can simply select the "Post now" button from the GUI 700 of FIG. 7.

Figure 8:
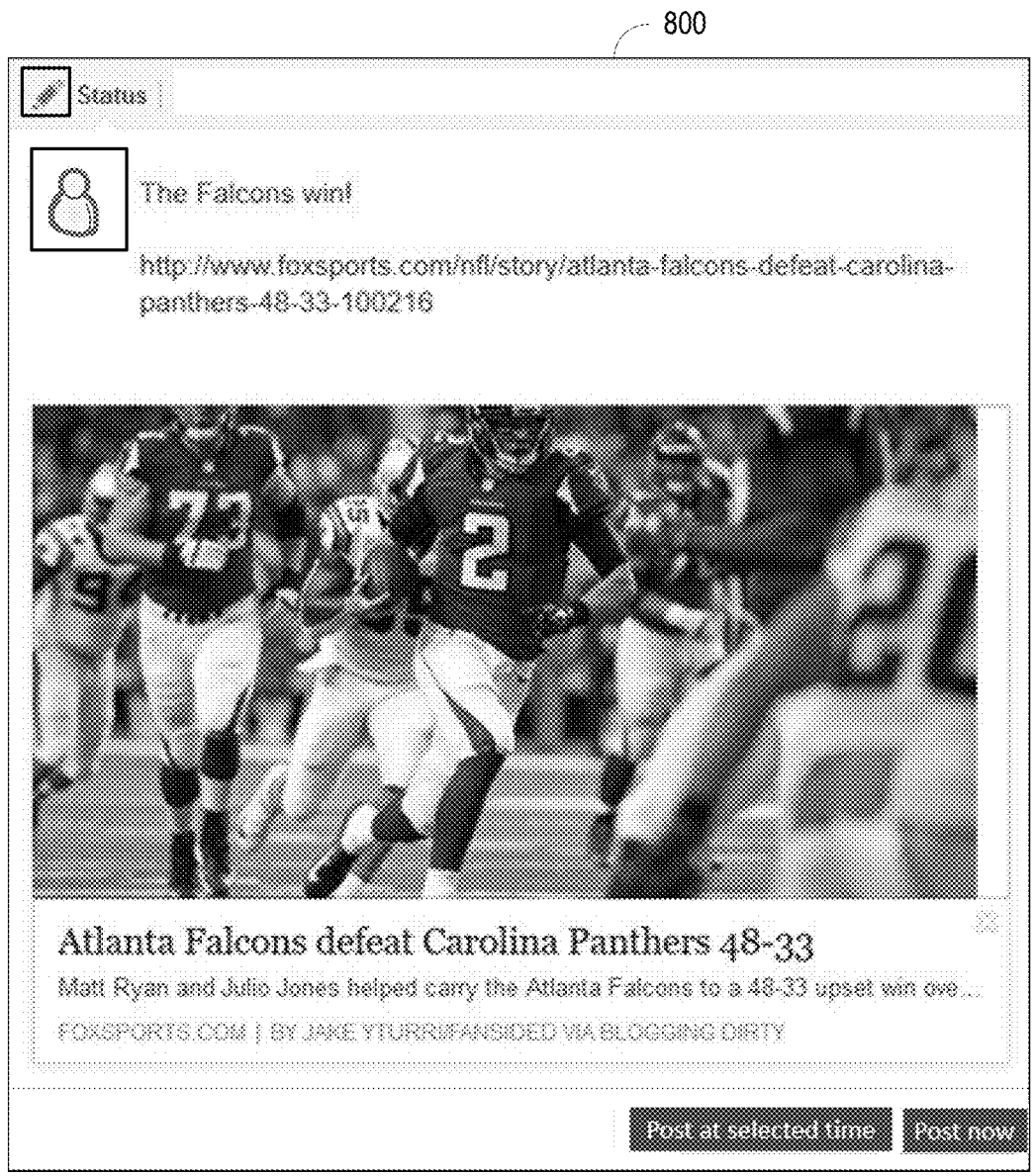
FIG. 8 illustrates an example user interface for selecting to post at a current time or at a previously selected delayed time.

In other example embodiments, after a selection by a user has been made to post at a future time, the next time the system presents the user with a GUI in which the user can create a post, the system can display through the GUI buttons that allow the user to enter a selection to "Post Now" or "Post at selected time." For example, as shown in the GUI 800 of FIG. 8.

Here, in these examples, the user has the option to "Post now" by selecting the "Post now" button. If the user selects "Post at selected time" the user can then be presented with another GUI providing the user the option to enter a different time (similar to FIG. 7, except having no "Post now" option since "Post now" already appears on the main posting interface).

In other example embodiment, when a user selects to post immediately, the social media platform may place into a queue information that the user has selected to be posted such that the information to be posted is posted in due course (i.e., as resources of the social media system that hosts the social media platform permit according to a best effort process). In another aspect, which may be offered as a premium feature, a social media platform hosting system can prioritize posting such that when a user selects to post immediately, or "Post Now" for example, the hosting platform can allocate hosting system resources so that the user's information is posted, or viewed by connections (e.g., contacts, friends) immediately, as opposed to whenever the hosting systems resources naturally cause the information to be posted. Additionally, when a user desires that others (e.g., social media contacts, connections, or friends of the user) be notified of the user's post, the system can present a "notify now" button selectable by the user. Subsequent to the user's selection, the system can be operable to notify others of the user's post immediately (or almost immediately), rather than notifying the others of the user's post hours or days later.

FIG. 9-12 depicts illustrates example GUIs illustrating aspects of embodiments in which a user of a social media application is provided the option to have his or posts (e.g., information to be posted, information that is posted), to be appended to another posting, whether the posting was made by friend/contact, or by some public source, such as a news source.

The system (e.g., social media framework host, computer/computing device running a social media application, or some combination of the two), can be operable for providing a user interface of the social media application that provides an interface to a social media platform. The user interface can be operable for receiving an input of information to be posted on the social media, and for receiving an indication from a user to append the information to be posted (e.g., as a comment or replay) to a posting made by others that comprises content related to the information to be posted. The information to be posted (or information posted if immediately posted) can be saved so that it can be retrieved from storage and appended to other postings (whether past or future) that relate to similar content. The system can analyze a plurality of postings by multiple sources on the social media platform, and append the information to be posted to the one or more of the plurality of postings if the one or more of the plurality of postings comprises content related to the information to be posted.

Figure 9:
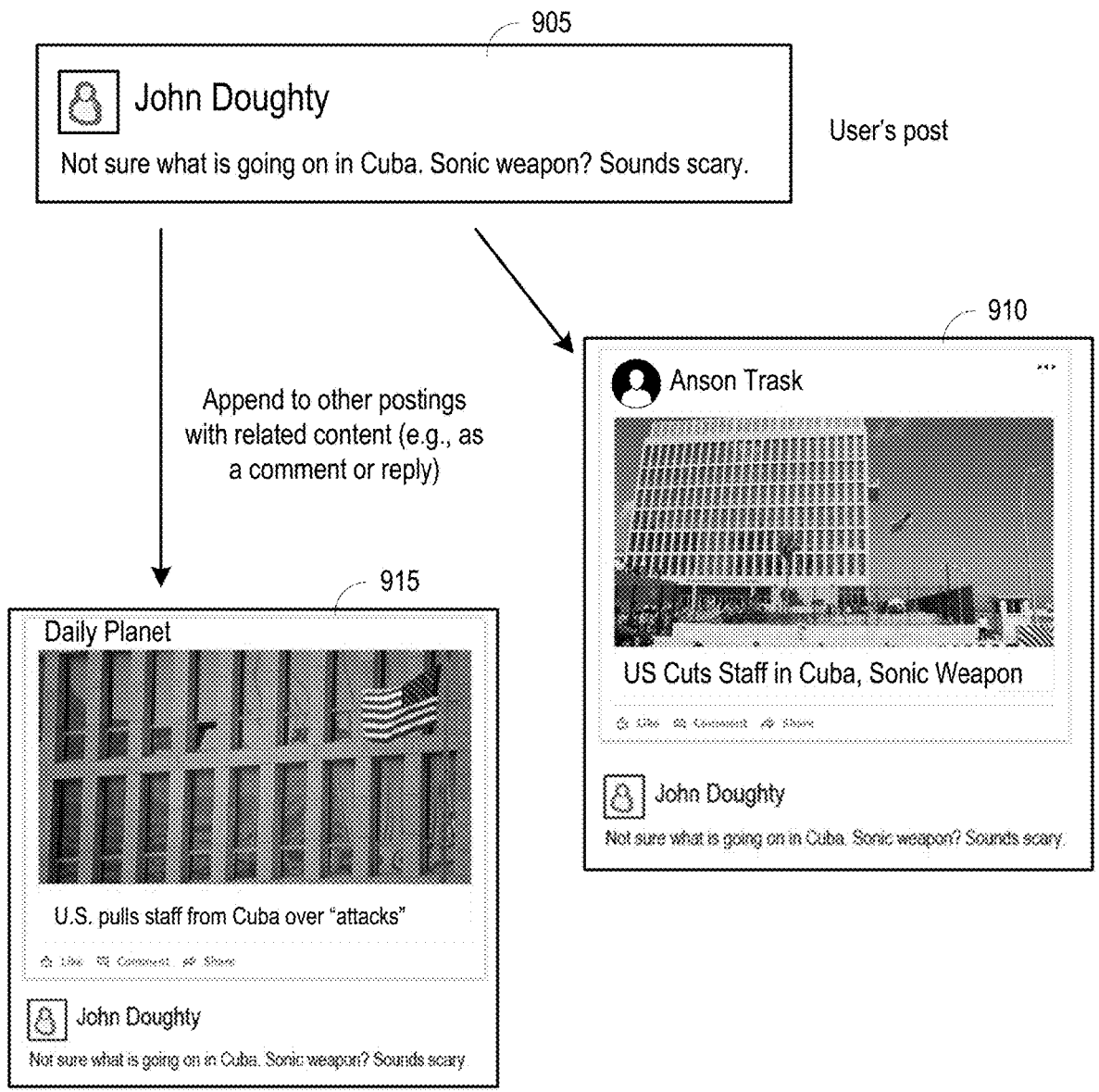
FIG. 9 illustrates an example method for implementing the delay of social media posts.

As shown in FIG. 9, a user (e.g., John Doughty) might use the social media application (which can be running as an application on the user's mobile device, or a running in a web browser), to make a post regarding a certain topic. In the example shown, the user makes a post using a GUI 905 generated by the system, regarding an incident in Cuba, perhaps involving attacks by a sonic weapon (e.g., "Not sure what is going on in Cuba. Sonic weapon? Sounds scary"). The system is operable to store the information from this post. The system can then can analyze a plurality of postings on the social media platform by, for example, search through the social media platform through a plurality of postings and making a determination as to whether one or more of the plurality of postings searched though contains content that is related to the information to be posted (or posted) by the user. This can be done, for example, using key-word searches, natural language searches, etc.

Referring to FIG. 9, one or more of the plurality of postings can be associated with one or more contacts associated with the user. As an example, referring to FIG. 9, a friend of the user, Anson Trask might have posted a news article regarding US evacuation of diplomats in Cuba. One or more of the plurality of postings can be associated with one or more public postings (e.g., public postings made by, for example, news sources such BBC, Time, CNN, USA Today, Breitbart, Politico, etc.). In the example shown in FIG. 9, the Daily Planet also posted a story regarding the U.S. pulling staff from its embassy over attacks in Cuba.

If the one or more of the plurality of postings comprises content related to the information to be posted, the system can append the information to be posted to the one or more of the plurality of postings. Thus, as shown in FIG. 9, the information to be posted by the user (e.g., John Doughty), which has been stored (and perhaps posted already) can be appended as a comment to Anson Task's post 910 regarding Cuba, and also as a comment to the Daily Planet's post 915 regarding Cuba. As such, his information to be posted (e.g., "Not sure what is going on in Cuba. Sonic weapon? Sounds scary.") would appear as a comment to those posts, as shown in FIG. 9.

FIG. 10 illustrates another example. Here, the user (e.g., John Doughty) responds to a posting made by another (Vax Potorr's posting regarding an incident in Cuba, perhaps involving attacks by a sonic weapon) by making a comment (e.g., "Not sure what is going on in Cuba. Sonic weapon? Sounds scary"). In this example, the system can analyze a plurality of postings on the social media platform, and append the comment to Vax Potorr's post to be posted to the one or more of the plurality of postings if the one or more of the plurality of postings comprises content related to the information to be posted (e.g., Anson Trask's post 1010, and the Daily Bugle's post 1015).

Moving to FIG. 11, in example embodiments, the system can also allow the user to receive a notification each time a posting is found to have related content, and prompt the user to choose whether he or she would like to have the information they posted appended to the posting for which the user received the notification. In the example shown in FIG. 11, the system can display a GUI 1105 notifying the user (e.g., John Doughty) that a posting made by one of his contacts (e.g., Vax Potorr) contained content that was similar or related, and prompt the user to select whether the user would like to have his or her post or comment appended to the found posting (e.g., appended to Vax Potorr's posting). If the user selects "Yes" then the system would append his or her comment to the posting (e.g., as a comment or reply to the posting). In an aspect, the user may also make a selection using a GUI that the information to be posted be posted at a delayed time instead of immediately. The selection of a delay time may be an already-selected time for posting, or a user may select a new delayed time for posting of the information to append to a posting having related content.

Figure 12:
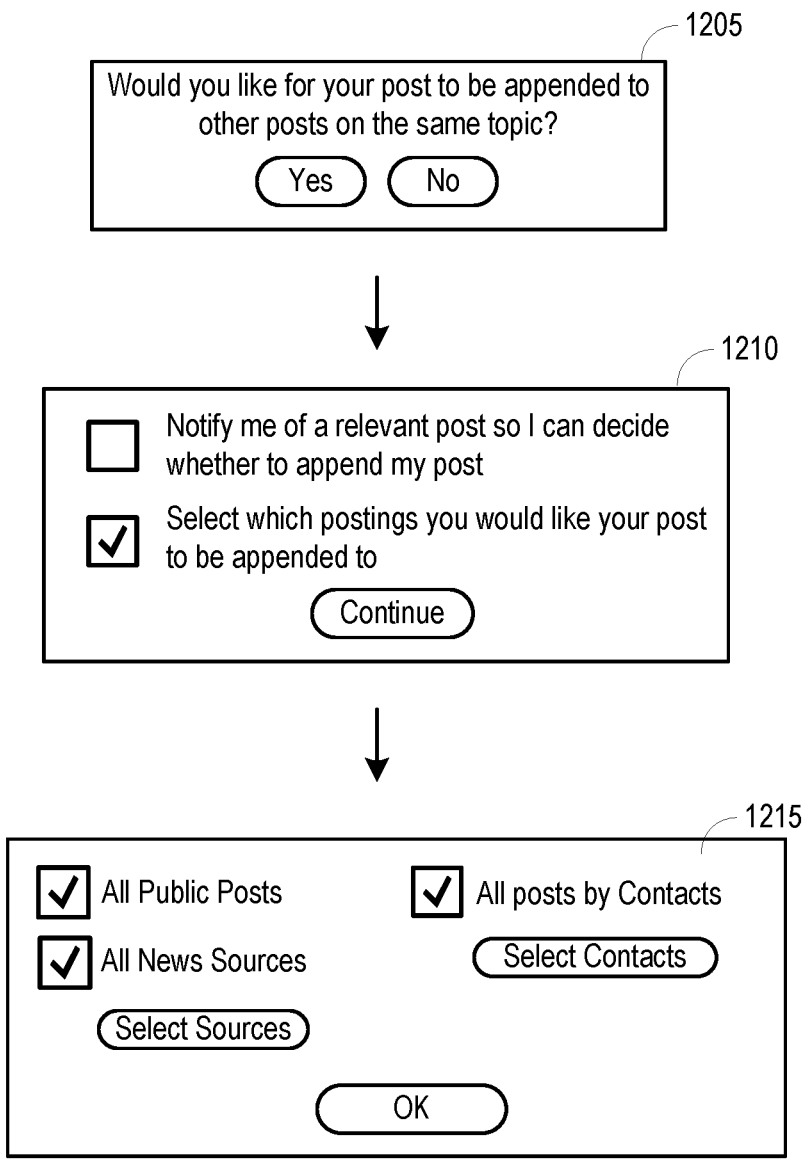
FIG. 12 illustrates user interfaces for allowing a user to select options related to appending information for posting to other social media posts.

FIG. 12 shows illustrative GUIs that provide a user with the ability to submit preferences as to whether they would like to have their comments appended, and where they would like to have their comments appended.

For example, the system can display GUI 1205 of FIG. 12, wherein the GUI can prompt a user "would you like for your post to be appended to other posts on the same topic?" Upon selection by the user (e.g., by selecting or clicking on the "yes" button) the system can, in example embodiments, save (e.g., store) the information to be posted. The information to be posted can be posted immediately, or it can be posted according to a user's selection of a time in accordance with, for example, FIGS. 3-8.

Referring to FIG. 12, the system can also present a GUI 1210 that is operable to allow the user to be alerted any time the system has found and analyzed a post containing content related to the information to be posted (or posted) by the user, upon which time the user can decide whether he/she wants their post to be appended to the alerted-to posting (e.g., as shown in FIG. 11 and described in FIG. 11's related text).

Alternatively, or additionally, the system, as shown in FIG. 12, can also allow the user to determine or select which of the (or whose) plurality of postings the user would like his or her information to be posted to be appended to. As shown in FIG. 12, the system can present a GUI 1210 prompting a user to "select which postings you would like your post to be appended to" or to "notify me of a relevant post so I can decide whether to append my post." In accordance with such an example, a user can select where his/her posts are to be appended.

If the user chooses to select which postings that his/her post can be appended to (e.g., in FIG. 1210, by checking the second box), the system can prompt the user with a GUI 1215 to select to which postings his/her information to be posted would be appended. As an example, the user can choose for his/her post to be appended to any public postings that have content related to his/her post. Or, as an example, the user select all the contacts or new sources in which his posts/comments would be appended should a posting by such contacts or news sources be analyzed and determined to have related content. If the user selects (e.g., clicks on) the displayed "Select Sources" button, the user can be prompted with a list of sources (or be prompted with a search field to search for a particular source) for selection. For example, the interface could provide a list of news sources (CNN, USA Today, Fox, BBC, etc.), and ask a user to check boxes next to those displayed new sources. The interface could also provide a list of the user's friends/contacts for the user to select. If the user selects a news source, e.g., the Daily Bugle, or one of his friends, e.g., Anson Trask, his post would be appended to any postings made by the Daily Bugle or Anson Trask. Thus, the one or more of the plurality of postings can be selected by the user based on an indication by the user as to which of the one or more of the plurality of postings associated with the one or more contacts associated with a user are to contain the information to be posted. Or, the one or more of the public postings can be selected by the user based on an indication by the user as to which of the one or more of the plurality of postings associated with the one or more public postings are to contain the information to be posted.

Figure 13:
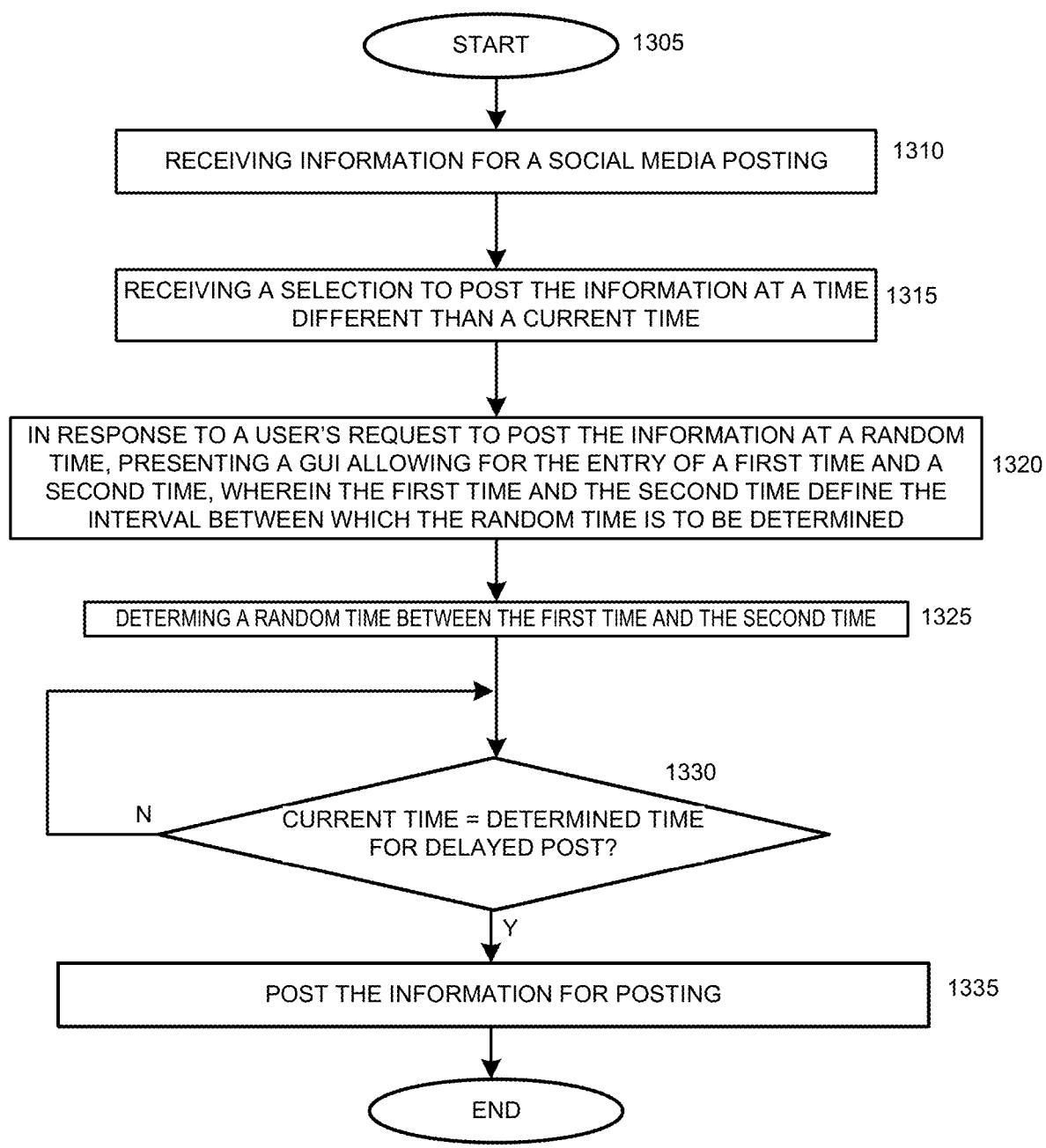
FIG. 13 illustrates a flow diagram of an example method delaying the posting of information to be posted.
Figure 14:
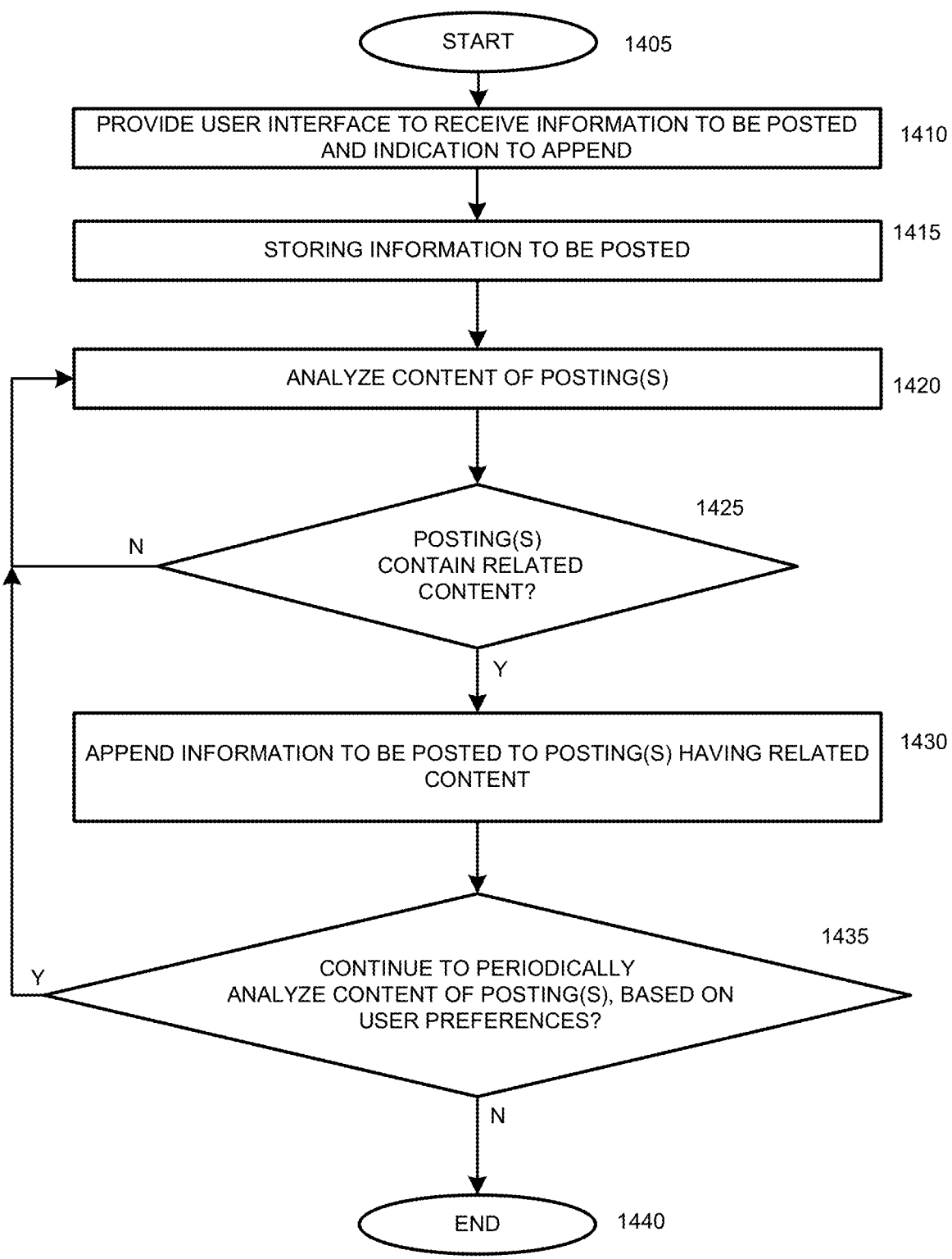
FIG. 14 illustrates a flow diagram of an example of a method for appending information to social media posts.
Figure 15:
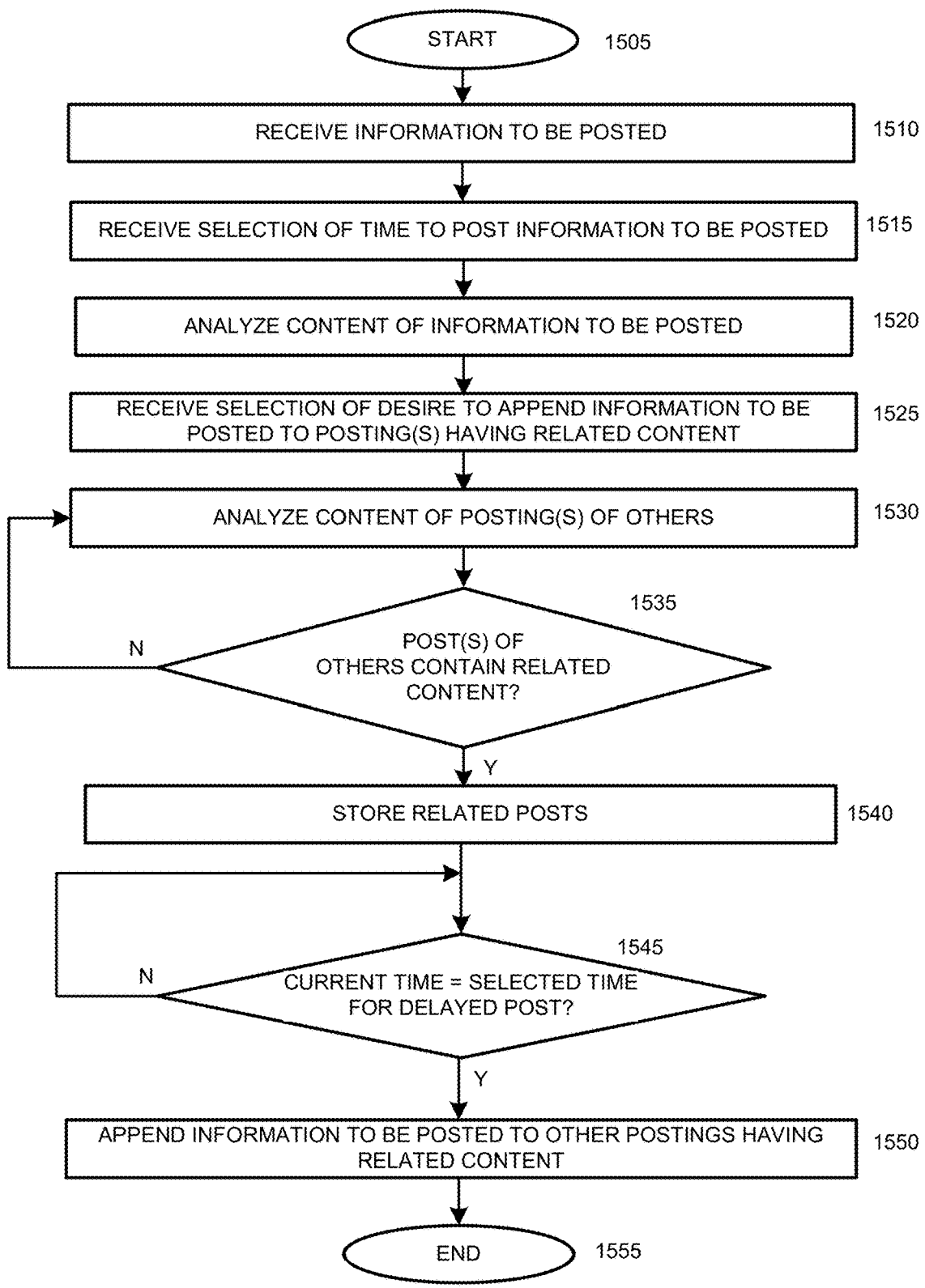
FIG. 15 illustrates a flow diagram of an example method for appending information to be posted to a posting of another having similar content.

In view of the examples described above, example method(s) that can be implemented in accordance with the disclosed subject matter can be better appreciated with reference to the flowcharts shown in FIGS. 13-15, and their corresponding text. The methods (e.g., processes and logic flows) described in this specification can be performed by devices comprising programmable processors that execute machine executable instructions to facilitate performance of operations described herein. Examples of such devices can be devices comprising circuitry and components as described in FIG. 16 and FIG. 17.

Referring to FIG. 13, a flow diagram showing a method 1300 for delaying a user's post is presented. The method 1300 can begin at 1305. At step 1310, the method can comprise receiving information for a social media posting associated with the user (e.g., in FIG. 1, the user's information comprises the text "Yep. I think I can make the Olympics. First thing I need to do—start eating like an Olympian" along with a link to an article from the Washington Post).

Figure 2:
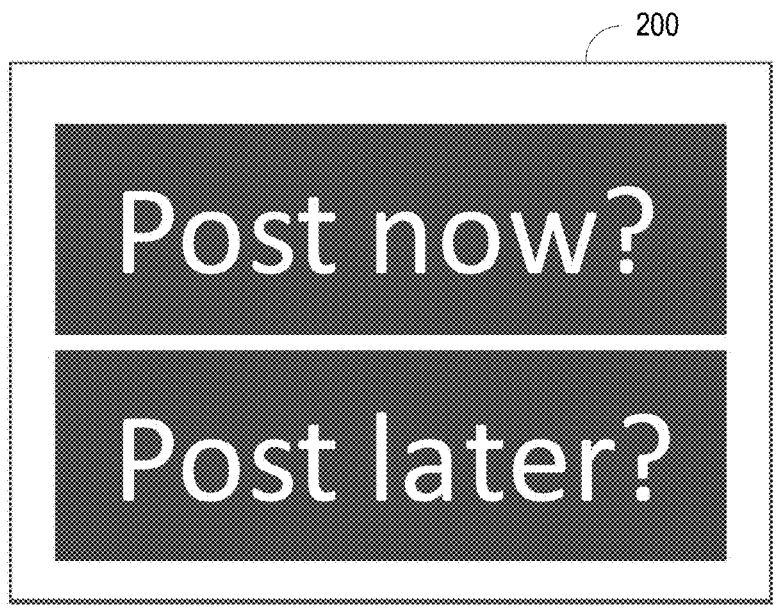
FIG. 2 illustrates an example user interface that presents an option to delay posting of information.

At step 1315, the method can comprise receiving, by the computing device, a selection to post the information at a time different than a current time. As shown in the example of FIG. 2, the user might have selected the "Post later" button. The information for posting can be saved (e.g., stored) upon or subsequent to receiving the user's indication to post the information at a later time.

At step 1320, in response to a user's request to post the information at a random time, presenting, by the computing device, a graphical user interface allowing for the entry of a first time and a second time, wherein the first time and the second time define an interval between which the random time is to be determined.

At step 1325, the method can comprise determining the random time between the first time and the second time. The determination can be made, for example, by the system hosting the social media platform (e.g., using a random number/value generator, or the like). The determination can be made, for example, by a computer device executing the social media application.

At step 1330, the method can comprise determining whether a current time (e.g., present time) is equal to the determined time (which, as mentioned above, can be determined randomly between the first time and the second time). If the current time does not equal the determined time, the method continues to evaluate whether the current time equals the determined time.

In response to the current time being the determined time, the method at step 1335 can comprising posting the information for the social media posting associated with the user.

In example embodiments, the method can optionally further comprise presenting, by the computing device, an option allowing a user to have future posts posted at the random time based on the entry of the first time and the second time.

In example embodiments, the method can optionally further comprise allowing a user to choose whether the social media posting is to be posted at the selected time (which can be a random time that was selected) or to be posted immediately, as shown in FIG. 8.

Turning now to FIG. 14, the figure illustrates a flow diagram of a method 1400 that can be performed, for example, by a computing device having a processor and memory that stores machine executable instruction that, when executed by the processor, facilitate performance of the method. The method begins at 1405.

At step 1410, the method comprises providing a user interface of the social media application that provides an interface to a social media platform. The user interface can be operable for receiving an input of information to be posted on the social media platform, and for receiving an indication from a user to append the information to be posted to a posting that comprises content related to the information to be posted.

In some example embodiments, at step 1415, the method can comprise saving (e.g., storing) the information to be posted. The information to be posted can be posted immediately, or it can be posted according to a user's selection of a time in accordance with, for example, FIGS. 3-8.

At step 1420, the method can comprise analyzing a plurality of postings on the social media platform. For example, one or more servers or computing devices implementing the social media platform can analyze a plurality of postings on its platform. One or more of the plurality of postings can be associated with one or more contacts associated with the user. As an example, referring to FIG. 9 and FIG. 10, a friend of the user, e.g., Anson Trask might have posted a news article regarding US evacuation of diplomats in Cuba. One or more of the plurality of postings can be associated with one or more public postings (e.g., public postings made by, for example, news sources such BBC, Time, CNN, USA Today, Breitbart, Politico, etc.). As shown in the example of FIGS. 9 and 10, the Daily Planet news source posted about the pulling of staff from Cuba over attacks.

At step 1425, a determination can be made as to whether the plurality of postings contain content that is related to information to be posted. This can be done, for example, using key-word searches, natural language searches, image recognition, audio analysis, etc.

In response to the content of any of the plurality of postings being related to the information to be posted (e.g., if the one or more of the plurality of postings comprises content related to the information to be posted), then at step 1430, method 1400 can comprise appending the information to be posted to the one or more of the plurality of postings (e.g., appended as a comment to the social media posting with related content, or a reply to a comment to the social media posting with related content). Examples are shown in FIGS. 9 and 10.

In some example embodiments, the appending the information to be posted can be done in accordance with a time selected by the user (e.g., in accordance with FIGS. 3-8, for example), which can be outside of the user's working hours.

In some example embodiments, as shown in step 1435, the analyzing of a plurality of postings on the social media platform is performed periodically subsequent to the receiving the indication from the user to append the information to be posted. This can be according to a user preference as to frequency and duration. As an example, a user might indicate a preference for the social media platform system (e.g., provided for by a host, host machines, host computers, host servers, network devices, etc.) to search the plurality of postings on the social media platform for analysis every 5 hours, or every day, for the next week. As an example, each time a posting. If the user's preferences indicate the user's desire for continued analysis to append the information (which, as mentioned, can be stored) to be posted, the method can move to step 1420. Otherwise, if the user's preferences are satisfied such that the user no longer desires for his or her posts to continue to be appended to upcoming postings, the method can end at step 1440.

Additionally, in some embodiments, the one or more of the plurality of postings can be selected by the user based on an indication by the user as to which of the one or more of the plurality of postings associated with the one or more contacts associated with a user are to contain the information to be posted. The one or more of the public postings can be selected by the user based on an indication by the user as to which of the one or more of the plurality of postings associated with the one or more public postings are to contain the information to be posted. For example, the user can select where the posts are to be appended. The user might indicate this preference in advance, for example, selecting all the contacts or new sources in which his information to be posted would be appended should a posting by such contacts or news sources be analyzed and determined to have related content. The method can also comprise allowing the user to receive a notification each time a posting is found to have related content, and prompt the user to choose whether he or she would like to have the information they posted appended to the posting for which the user received the notification. In response to the user electing (or making a selection, for example by clicking on a button) to append his or her information to be posted to the posting found to have related content, the information to be posted can be appended to the posting.

Turning now to FIG. 15, the figure illustrates a flow diagram of a method 1500 for appending a delayed posting of information to be posted to one or more postings of one or more other users of a social media application or platform. Method 1500 begins at step 1505. At step 1510, the social media platform or application provides a user interface ("UI"), typically a graphical user interface ("GUI"), and receives an input of information to be posted via the interface. At step 1515, the UI receives a selection of a time when the information to be posted should be posted. If the selection of time when the information to be posted should be posted is a time value other than a current time value, the selected time to post may be referred to as a delay time, or a delayed time; the aspect of posting at a time that is different from a current time may be referred to a delayed posting or postponement of posting.

The selection of time for delayed posting may be a time certain, a range between beginning and ending time values, which may be referred to as corresponding first and second time values, multiple ranges between corresponding different beginning and ending time values, an offset from a current time (i.e., an amount of time in the future from a present time instead of a time certain), or other selection of a time to post other than a current, or present time. In an aspect, when a range between first and second times is selected, a random value in the selected range may be generated by a computing device for use in comparing to a present time as discussed below in connection with step 1545. A present/current time value may be determined by a user device such as a smart phone, a personal computer, or a tablet running or interacting with the social media application, a hosting computer system that hosts the social media platform or application, or other means for providing a current time value to a system running the social media application, platform, or user interface.

At step 1520, the social media application or platform may analyze the information to be posted to determine content, a summary, a gist, a main idea thereof, or the like. The analysis of content may be based on individual terms, phrases, numbers, image recognition analysis, audio recognition/analysis, references to other users by their real names, their user names, device identifiers of their user devices, or other means for determining, suggesting, deriving, or inferring a general topic, main idea, gist, headline, etc.

At step 1525, the user interface may receive a selection of a desire to post, or append, the information to be posted to content of others that is related to the information to be posted.

At step 1530, the social media application or platform, or device running the social media application, may analyze postings of other users who have posted via the social media platform to determine content of the postings of other users. The analysis of content may be based on individual terms, phrases, numbers, image recognition analysis, audio recognition/analysis, references to other users by their real names, their user names, device identifiers of their user devices, or other means for determining, suggesting, deriving, or inferring a general topic, main idea, gist, headline, etc.

At step 1535, if the social media platform, application, or device running the application or platform, determines that a posting of another user, which may be a contact, friend, linked profile, linked account and the like, that is associated with a user, or user account, that corresponds to the information to be posted that was received at step 1510, the social media platform application, or device running same, may store, or buffer, the content, or posting of the other user, or users, at step 1540.

At step 1545, a determination is made whether the user has selected, chosen, or indicated a desire to delay posting the information to be posted, for example at step 1515, and whether a current time, or present time, of the system hosting the social media application or platform has reached a value that is substantially the same as a time selected at step 1515 for delaying the posting of information to be posted that was received at step 1510. If the present time is not substantially the same as the time selected at step 1515, method 1500 returns to step 1545.

When the present time is substantially the same as the time selected at step 1515, the method 1500 advances to step 1550 and appends the information to be posted that was received at step 1510 to one or more postings of others that include similar content as the information to be posted, based on comparison of the results of the analyses at steps 1520 and 1530. Method 1500 ends at step 1555.

In another embodiment, instead of automatically posting the information to be posted to posts of others having related content when a present time is substantially the same as a selected time for delayed posting, the platform may provide an alert to a user, or device of a user, who provides the information to be posted when content of postings of other users, friends, contacts, profiles, entities, and the like post information or content via the social media platform that contain(s) substantially related content. Upon receiving an alert, the user who provided the information to be posted may select, via the GUI, whether the platform should append the information to be posted to one or more posting(s) having content related thereto. If the user using the GIU makes an affirmative selection therewith to append to posts having related content, the platform, application, or device may append the information to be posted to the one or more other postings of one or more other users having related content. The GUI may provide a selection item (i.e., button, drop down box, etc.) so that a user can select whether the appending of the information to be posted is to be made immediately, or according to a time selected for delayed posting. Upon receiving the alert, the user may use the GUI to select that the information to be posted should be posted according to an already-selecting time for delayed posting, or the GUI may present an option that a user may select a new delay time for posting.

According to various embodiments, social-media related functionalities, processes and logic flows described in this specification (including the methods described above in FIGS. 13, 14, 15) may be performed by a system ("system") that includes, but is not limited to (e.g., comprises), one or more programmable processors (e.g., processor 202) executing one or more computer program modules to perform functions by operating on input data and generating output, thereby tying the process to a particular machine (e.g., a machine programmed to perform the processes described herein). This includes processors located in one or more of client computers (e.g., user devices running a social media application). These devices connected to a network may access and execute one or more Internet browser-based program modules that are "served up" through the network by one or more servers (e.g., hosts that support a social media framework), and the data associated with the program may be stored on one or more storage devices, which may reside within a server or computing device, be attached as a peripheral storage device to the one or more servers or computing devices, or attached to the network.

Figure 16:
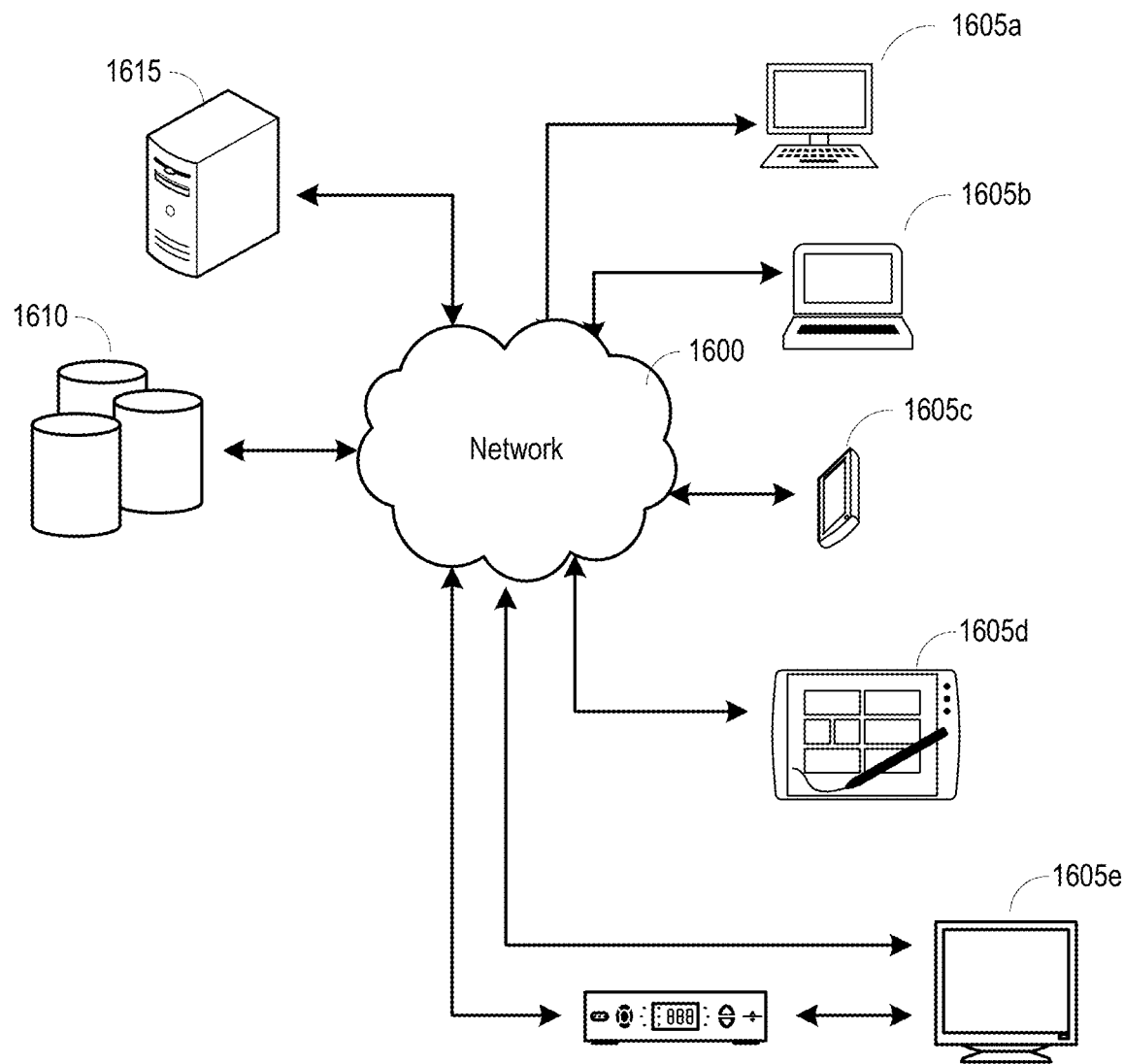
FIG. 16 illustrates a diagram of an example system for providing a social media platform, application, or user interface via a communication network.

FIG. 16 is a diagram illustrating an example network environment in which a system and method are capable of handling the operational aspects of the functionalities described above.

Users (from work, home, or another location) can work through a network (e.g., network 1600). They can send communications (such as email or instant messages) to each other, store documents on-line, or even run on-line applications (for example, a web-based application), through the network, and post from social media applications (including a social media application operable to perform the functions described in the application herein).

The network (e.g., network 1600) can be comprised of one or more networks interconnected to other networks. The network 1600 can comprise one or more types of networks, such as ring based networks (e.g., Token Ring), collision-based networks (e.g., Ethernet), telephony (ATM/DSL/aDSL), cable (DOCSIS, PacketCable), cellular LTE/GSM/UMTS), satellite (e.g., DBS), WiMAX networks implementing 802.16 family of networking standards, or wireless networks (e.g., Wi-Fi (802.11 family). In different or even composite implementations, network 1600 can be comprised of local area networks (LANs) in the office, which are connected with outside networks that allowed access to the Internet. The network 1600 can also connect multiple offices to attract different regions of customers, or different personnel talent from many regions. The network 1600 can comprise wide area networks (WANs) that connect LANs from disparate offices. The network 1600 can also comprise the use of virtual private networks (VPNs), which can provide secure connections between individual users and their organization's network over the Internet. The network 1600 can also employ the use of remote desktop architecture, which can use software or an operating system that allows applications to run remotely on a server, but be displayed locally on a user's computing device. Additionally, the network 1600 can employ the use of cloud computing and cloud storage, whereby data can be stored on remote servers accessed from the Internet, or cloud. These servers can be maintained, operated and managed by a cloud storage service provider on storage servers that are built on virtualization processes and techniques. Access to the network 1600 can be managed accordingly.

A variety of computing devices can be attached to the network. One or more devices (shown as "user device 1605a-1605e) can include desktop computers, laptops, cellphones (e.g., smartphones, PDAs), tablet computers, browser and Internet capable set-top boxes connected with a TV, or even smart TVs having browser and Internet capability. The devices attached to the network can also include storage devices 1610 (e.g., configured as RAIDs, SAN, NAS, JBODs, or cloud-based storage), and also server(s) 1615 (which can also have peripheral storage, internal storage, or both). Some of ordinary skill might view many of these devices, storage devices, and servers as part of the network, so this interpretation is contemplated to be within the scope of this application as well. These devices can be physically located in a central location, like the headquarters of the organization, for example, or in separate facilities. The devices can also be mobile (e.g., cellphone, tablet). The devices may be owned or maintained by employees, contractors, or other third parties (e.g., a cloud service provider).

The processes and logic flows described in this specification for operationalizing privacy compliance can be performed by one or more programmable processors executing one or more computer programs to perform functions by operating on input data and generating output, thereby tying the process to a particular machine (e.g., a machine programmed to perform the processes described herein). This comprises processors located in the devices described in FIG. 16 and FIG. 17 below, which describes the general circuitry of such example computing devices in more detail. As an example, devices attached to network can access and execute an Internet browser-based program for operationalizing privacy compliance, which was "served up" by a server, and the data associated with the program can be stored on a storage device attached to the server, or attached to the network (e.g., storage). Collectively, the software (one or more software modules), executed by hardware (e.g., servers, storage, and user devices, individually and collectively) can be referred to herein as the "system."

Figure 17:
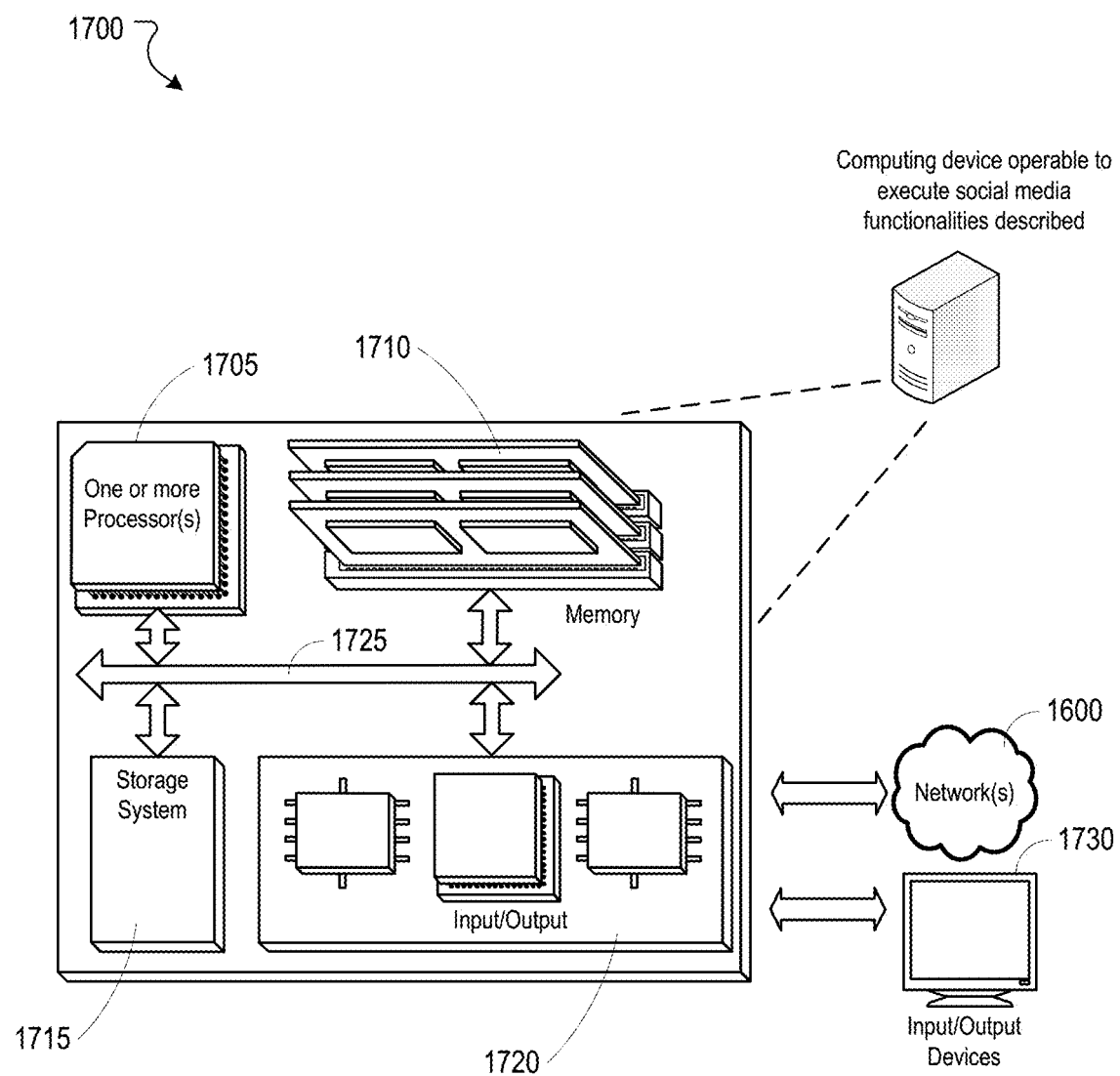
FIG. 17 illustrates a diagram of an example device for providing social media functionality.

FIG. 17 shows a block diagram that illustrates an example of a system (e.g., computing device 1700) that can store and execute a program, in conjunction with other network elements (e.g., servers, network elements), that can perform the social media functionalities described above.

The system 1700 can include one or more processors (e.g., one or more processor(s) 1705), one or more memory devices (e.g., memory 1710), one or more storage devices (e.g., storage system 1715), and an input/output interface (e.g., input/output 1720). Each of the components can, for example, be interconnected via a system bus 1725. The processor 1705 is capable of processing instructions for execution within the system. The processor 1705 can be single-threaded processor, or it can be a multi-threaded processor. The processor 1705 is capable of processing instructions stored in the memory 1710 or on the storage device 1715.

The memory 1710 stores information within the device. The memory 1710 can be a computer-readable medium, and can be volatile memory or non-volatile memory.

The storage device 1715 is capable of providing mass storage for the device. In one embodiment, the storage device is a computer-readable medium. In various different embodiments, the storage device can, for example, a hard disk device, an optical disk device, flash memory, solid state drive, or some other large capacity storage device. The storage device 1715 need not be local—it can be one or more storage devices attached to the network (e.g., RAID, SAN, NAS, JBOD, cloud storage).

The input/output interface 1720 can provide input/output functions for the device 1700. The input/output interface 1720 can include one or more of a PSTN trunk interface (e.g., an RJ11 connector), an IP network interface device, (e.g., an Ethernet card), a cellular network interface, a serial communication device (e.g., and RS-232 port), and/or a wireless interface device (e.g., an 802.11 receiver card). In another embodiment, the input/output interface 1720 can include driver devices configured to receive input data and send output data to other input/output devices 1730 (e.g., a graphics processor coupled to a monitor or computer screen), as well as sending communications to, and receiving communications from, various networks as described above with respect 1600.

The program for performing the social media functionalities of this disclosure can be implemented by instructions that upon execution cause one or more processing devices (e.g., device of FIG. 1700) to carry out the processes and functions described above. Such instructions can, for example, comprise interpreted instructions, such as script instructions, e.g., JavaScript or ECMAScript instructions, or executable code, or other instructions stored in a computer readable medium.

Embodiments of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products (i.e., one or more modules of computer program instructions encoded on a tangible program carrier for execution by, or to control the operation of, a data processing apparatus). The tangible program carrier can be a propagated signal or a computer readable medium. The propagated signal is an artificially generated signal (e.g., a machine generated electrical, optical, or electromagnetic signal) that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system" encompasses all apparatus, devices, and machines for processing data, including by way of example a programmable processor, a computer, or multiple processors or computers. The system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operable coupled to receive data from or transfer data to, or both, one or more mass storage devices for storing data (e.g., magnetic, magneto optical disks, or optical disks). However, a computer need not have such devices. Moreover, a computer can be embedded in another device (e.g., a mobile communications device, a telephone, a cable modem, a set-top box, a mobile audio or video player, or a game console, to name just a few).

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; solid state drives (SSDs); and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display. These include, for example, a CRT (cathode ray tube), LCD (liquid crystal display), LED (light emitting diode) display, for displaying information to the user and can also include a keyboard and a pointing device (e.g., a mouse, touchpad, trackball, or stylus) by which the user can provide input to the computer). Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. Further, the processes depicted in the accompanying figures do not necessarily require the particular order shown, or sequential order, to achieve desirable results. In some embodiments, multitasking and parallel processing may be advantageous.

What is claimed is:

1. A network device comprising:
    a processor that executes a social media platform;
    a memory having stored thereon computer executable instructions, that when executed by the network device, enables the network device to be operable to:
        provide an interface to a social media platform, wherein the user interface is operable to:
            receive an input of information to be posted on the social media platform;
            receive a selected time to post indicative of a posting time at which the information to be posted is desired to be posted;
        store the selected time to post;
        in response to a determination that a present time has reached the selection time, post the information via the social media platform;
    wherein the selected time to post comprises an indication from a user to post the information to be posted when a posting of a contact associated with a user of the user interface comprises content related to the information to be posted; and
    wherein the network device is further operable to:
        receive a selection to delay posting until the posting from the contact associated with a user of the user interface comprises content related to the information to be posted;
        analyze postings on the social media platform by one or more contacts associated with the user of the user interface; and
        append the information to be posted to at least one of the one or more of the postings using the social media platform when the at least one of the one or more of the postings comprises content related to the information to be posted.

2. The network device of claim 1, wherein the selected time to post is a time that is as soon as resources permit.

3. The network device of claim 1, wherein the selected time to post is a time that requires an allocation of resources so that the information to be posted is posted sooner that a hosting system's resources would otherwise permit, wherein the hosting system hosts the social media platform.

4. The network device of claim 1, wherein the selected time to post comprises a randomly selected time within a time range.

5. The network device of claim 4, wherein the randomly selected time is selected by the network device.

6. The network device of claim 4, wherein the randomly selected time is selected by user device that executes a social media application of the social media platform.

7. The network device of claim 1, wherein the user interface is further operable to present the user with an option to post the information to be posted immediately to a destination based on a user's preference.

8. The network device of claim 1, wherein the network device is further operable to:
    analyze postings on the social media platform by one or more contacts associated with the user of the user interface; and
    append the information to be posted to one or more of the postings using the social media platform when the posting comprises content related to the information to be posted.

9. The network device of claim 1, wherein the selected time to post comprises an indication from a user to provide an alert when a posting of a contact associated with a user of the user interface comprises content related to the information to be posted.

* * * * *